United States Patent
Bradshaw et al.

Patent Number: 5,154,151
Date of Patent: Oct. 13, 1992

[54] METHOD AND APPARATUS FOR CONTROLLING ENGINE TORQUE AND WHEEL SPIN

[75] Inventors: Benjamin J. Bradshaw, Solihull; Barry J. Bridgens, Quarry Bank; Michael J. Howes, Solihull, all of England

[73] Assignee: Lucas Industries public limited company, England

[21] Appl. No.: 658,388

[22] Filed: Feb. 20, 1991

[30] Foreign Application Priority Data

Feb. 23, 1990 [GB] United Kingdom ............... 9004190

[51] Int. Cl.⁵ .................................... F02D 17/02
[52] U.S. Cl. ................... 123/481; 123/198 F; 180/197
[58] Field of Search ............. 180/197; 123/198 F, 123/481

[56] References Cited

U.S. PATENT DOCUMENTS

| | | | |
|---|---|---|---|
| 4,172,434 | 10/1979 | Coles | 123/481 |
| 4,432,430 | 2/1984 | Lind et al. | 123/481 |
| 4,489,695 | 12/1984 | Kohama et al. | 123/198 F |
| 4,550,704 | 11/1985 | Barho et al. | 123/481 |
| 4,860,849 | 8/1989 | Andersson et al. | 180/197 |
| 4,951,773 | 8/1990 | Poirier et al. | 123/481 |
| 4,991,558 | 2/1991 | Daly et al. | 123/481 |
| 5,025,881 | 6/1991 | Poirier et al. | 123/481 |

FOREIGN PATENT DOCUMENTS

| | | |
|---|---|---|
| 0322790 | 7/1989 | European Pat. Off. |
| 3913523 | 11/1989 | Fed. Rep. of Germany |
| 2524556 | 10/1983 | France |
| 2601413 | 1/1988 | France |

Primary Examiner—Tony M. Argenbright
Attorney, Agent, or Firm—Staas & Halsey

[57] ABSTRACT

A wheel spin detector monitors the speeds of vehicle wheels and supplies a signal to an engine management system when excessive wheel spin is detected. The engine management system includes a fuel controller which, in response to the signal from the detector, reduces engine torque by inhibiting the supply of fuel to one or more cylinders of the engine such that either all cylinders are continuously fuelled or continuously unfuelled or one and only one cylinder is intermittently fuelled. When an unfuelled cylinder is fuelled again, the mixture supplied to it may be temporarily enriched.

14 Claims, 7 Drawing Sheets

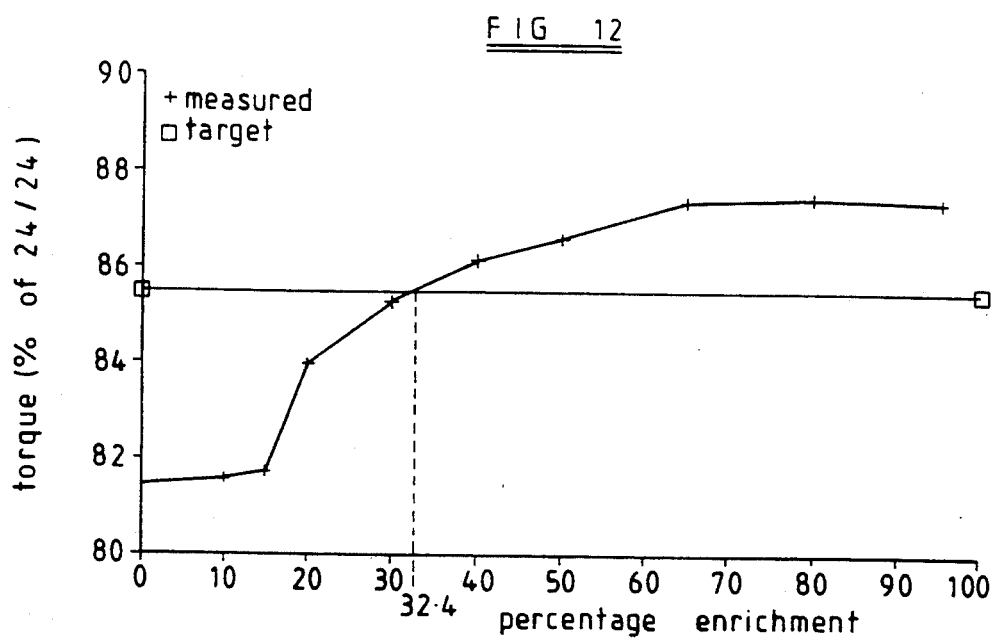

METHOD AND APPARATUS FOR CONTROLLING ENGINE TORQUE AND WHEEL SPIN

The present invention relates to a method of and an apparatus for controlling the torque produced by an internal combustion engine, and to a method of and an apparatus for controlling wheel spin for a vehicle driven by an internal combustion engine.

Smooth and stable propulsion of wheeled vehicles relies on an adequate co-efficient of friction between the tyres on the driven wheels of the vehicle and the ground so as to avoid wheel spin. Wheel spin occurs when the tangential speed of a tyre at its point of contact with the ground is greater than the speed of the wheel axis parallel to the tangent. During driving on surfaces of normal co-efficients of friction, wheel spin is not a problem because the torque produced by the engine at the driven wheels is not generally large enough to cause wheel spin. However, on poor surfaces such as snow, ice, gravel, mud, and water logged surfaces, the co-efficient of friction is greatly reduced and wheel spin can be initiated all too easily, even by a careful driver.

When the wheels of a driven axle spin, the ability of that axle to prevent unwanted lateral movement is greatly reduced or eliminated so that the vehicle tends to slide laterally or to yaw. In extreme cases, the driver can lose control of the vehicle with potentially disastrous results.

It has been found that a small degree of wheel spin does not cause substantial loss of stability and may even improve grip. However, large degrees of wheel spin should be avoided or reduced to acceptable levels in order to avoid lateral instability caused by poor ground surfaces and/or poor driving technique. U.S. Pat. No. 4860849 and EP 0283453 disclose a technique for eliminating wheel spin in vehicles driven by internal combustion engines. The degree of wheel spin is measured by comparing the speed of driven wheels of the vehicle with the speed of undriven wheels, which in the absence of braking do not spin or slip with respect to the ground. When excessive wheel spin is detected, the fuel supply to one or more of the cylinders of the internal combustion engine is cut off so as to reduce the engine torque and hence the driving torque at the wheels until wheel spin is eliminated or reduced to an acceptable level.

In order to permit the engine torque to be varied in steps over a sufficiently large range of values while maximising the smoothness of running of the engine, fuel is cut off from cylinders in a sequence such that the pattern of unfuelled cylinders is evenly distributed over one or several firing cycles of the engine. However, this may entail cutting off fuel to one or more cylinders such that a particular cylinder is only fuelled intermittently, for instance during alternate engine firing cycles. This results in unexpectedly low engine torque, especially when more than one cylinder is being fuelled intermittently. Proper control of engine torque, and hence of wheel spin, is therefore impaired as will be described hereinafter.

The term "continuously fuelled" as used herein means that fuel is supplied with the appropriate timing such that every firing event of the cylinder takes place. The term "intermittently fuelled" as used herein means that fuel is supplied such that some firing events of a cylinder take place whereas others do not. The term "continuously unfuelled" as used herein means that no fuel is supplied for a time period such that several consecutive firing events of a cylinder do not take place.

According to a first aspect of the invention, there is provided a method of controlling the torque of a multi-cylinder internal combustion engine, comprising selectively operating the engine in any one of a plurality of reduced torque modes, in each of which at least one cylinder is continuously unfuelled and the or each remaining cylinder is continuously fuelled.

According to a second aspect of the invention, there is provided an apparatus for controlling the torque of a multi-cylinder internal combustion engine, comprising a fuel controller arranged to operate the engine in any one of a plurality of reduced torque modes by inhibiting the supply of fuel to at least one cylinder such that, in each mode, at least one cylinder is continuously unfuelled and the or each remaining cylinder is continuously fuelled.

According to a third aspect of the invention, there is provided a method of controlling the torque of a multi-cylinder internal combustion engine, comprising selectively operating the engine in any one of a plurality of reduced torque modes, in each of which one and only one cylinder is intermittently fuelled.

According to a fourth aspect of the invention, there is provided an apparatus for controlling the torque of a multi-cylinder internal combustion engine, comprising a fuel controller arranged to operate the engine in any one of a plurality of reduced torque modes by inhibiting the supply of fuel to at least one cylinder such that, in each mode, one and only one cylinder is intermittently fuelled.

According to a fifth aspect of the invention, there is provided a method of controlling the torque of a multi-cylinder internal combustion engine, comprising selectively operating the engine in any one of a plurality of reduced torque modes, the plurality of reduced torque modes comprising a first set of modes, in the or each of which at least one cylinder is continuously unfuelled and the or each remaining cylinder is continuously fuelled, and a second set of modes, in the or each of which one and only one cylinder is intermittently fuelled.

According to a sixth aspect of the invention, there is provided an apparatus for controlling the torque of a multi-cylinder internal combustion engine, comprising a fuel controller arranged to operate the engine in any one of a plurality of reduced torque modes by inhibiting the supply of fuel to at least one cylinder, the plurality of reduced torque modes comprising a first set of modes, in the or each of which at least one cylinder is continuously unfuelled and the or each remaining cylinder is continuously fuelled, and a second set of modes, in the or each of which one and only one cylinder is intermittently fuelled.

The supply of fuel may be inhibited in accordance with a respective repeating sequence of unfuelled cylinders corresponding to each of the reduced torque modes, with each sequence repeating every N complete engine cycles, where N is an integer greater than one. By distributing the unfuelled cylinders over more than one engine cycle, finer control of torque is possible. Thus, for an engine having X cylinders, where X is an integer greater than one, there are (N.X−1) possible reduced torque modes between full torque and zero torque, although not all of the available modes may be used in a specific application.

Preferably, in the or each second mode, the intermittently fuelled cylinder is supplied with an enriched combustible mixture when being fuelled.

When changing between modes such that an unfuelled cylinder becomes fuelled, its mixture may also be enriched for one or more cylinder cycles when it is again fuelled.

According to a seventh aspect of the invention, there is provided a method of controlling the torque of a multi-cylinder internal combustion engine, comprising reducing engine torque by intermittently fuelling at least one cylinder and enriching the combustible mixture supplied to the or each intermittently fuelled cylinder in a fuelled cycle of the cylinder following an unfuelled cycle thereof.

According to an eighth aspect of the invention, there is provided an apparatus for controlling the torque of a multi-cylinder internal combustion engine, comprising a fuel controller arranged to reduce engine torque by intermittently fuelling at least one cylinder and enriching the combustible mixture supplied to the or each intermittently fuelled cylinder in a fuelled cycle of the cylinder following an unfuelled cycle thereof.

According to a ninth aspect of the invention, there is provided a method of controlling wheel spin for a vehicle driven by a multi-cylinder internal combustion engine, comprising detecting wheel spin and controlling the engine so as to reduce engine torque by means of a method according to any one of the first, third, fifth, and seventh aspects of the invention According to a tenth aspect of the invention, there is provided an apparatus for controlling wheel spin for a vehicle driven by a multi-cylinder internal combustion engine, comprising means for detecting wheel spin and an apparatus according to any one of the second, fourth, sixth and eighth aspects of the invention arranged to reduce engine torque in response to detection of wheel spin by the detecting means.

Engine torque may be progressively reduced until wheel spin falls below a first predetermined level, after which torque may be progressively increased until wheel spin exceeds a second predetermined level, which may be equal to or different from the first predetermined level.

Such apparatus may be used with a multi-point fuel injection system, for instance forming part of an engine management system. The wheel spin detecting means may form part of an anti-lock brake system.

The invention will be further described, by way of example, with reference to the accompanying drawings, in which:

FIGS. 9 to 12 are graphs showing torque (as a percentage of full engine torque with no fuel inhibition) against the percentage of fuel enrichment for an intermittently fuelled cylinder for various engine operating conditions.

Figure 1:
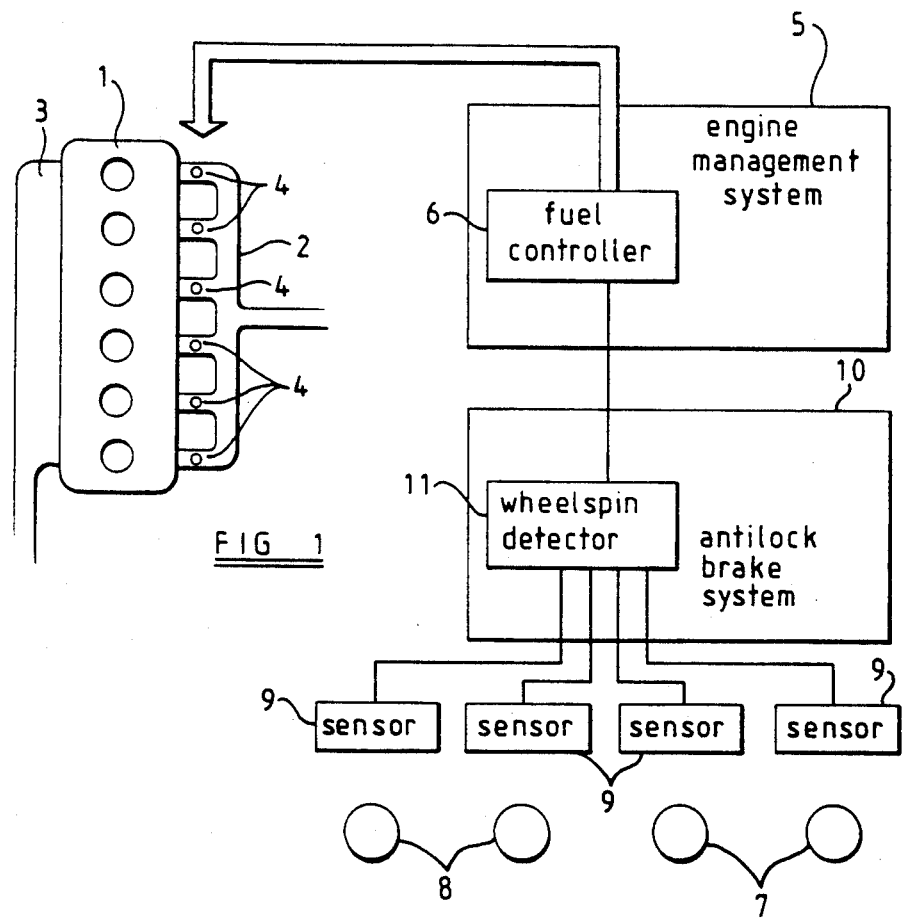
FIG. 1 is a block schematic diagram of part of a vehicle control system including a wheel spin controller constituting a preferred embodiment of the invention.

FIG. 1 shows an internal combustion engine 1 of the six cylinder spark-ignition type with an inlet manifold 2 and an exhaust manifold 3. The engine is provided with a multi-point fuel injection system including individual fuel injection nozzles 4 for metering fuel individually to the cylinders of the engine.

Operation of the engine is controlled by an engine management system 5 including a fuel controller 6 which supplies signals to the injectors 4 with the appropriate timing and of the appropriate length to ensure that a desired quantity of fuel is metered into the inlet manifold tract of each cylinder with the correct timing. The engine management system 5 has other inputs and outputs which, for the sake of clarity, are not shown in FIG. 1.

Use of a wheel spin controller in a vehicle having two wheel drive and an anti-lock brake system (ABS) is illustrated in the drawings. However, such a controller may be used in vehicles without ABS, and in all-wheel drive vehicles with and without ABS. In such alternative applications, wheel speed sensors may be provided as necessary, and vehicle speed may be determined in other ways, such as from an average of wheel speeds or from a speed over ground transducer.

The engine 1 drives a vehicle by means of a transmission (not shown) and driven wheels 7 on a front or rear axle of the vehicle. The vehicle also has a pair of undriven wheels 8 and each of the wheels is provided with a sensor 9 for supplying signals representing wheel speed to an anti-lock brake system 10 which includes a wheel spin detector 11. The anti-lock brake system 10 has various other inputs and outputs which, for the sake of clarity, are not shown in FIG. 1.

The engine management system 5 and the anti-lock brake system 10 may be embodied as discrete analog and/or digital electronic circuits. However, they are preferably embodied as micro-computer-based systems controlled by software resident in read-only memory. The arrangement shown in FIG. 1 comprises hardware which may already be present in existing vehicle control systems without wheel spin control and such systems merely require additional software in order to perform wheel spin control.

In operation, the wheel spin detector 11 monitors the speeds of the individual wheels 7, 8 of the vehicle by means of the sensors 9 and indicates wheel spin when the speed of the or each driven wheel 7 represents wheel spin. For instance, the wheel spin detector 11 may indicate wheel spin when one or each of the driven wheels 7 accelerates at greater than a predetermined rate. Alternatively, the speeds of the driven wheels 7 may be compared with the speeds of the undriven wheels 8, which cannot exhibit wheel spin, and the difference in speeds is used to provide an indication of the degree of wheel spin. The degree of wheel spin may be indicated by the difference between the speed of a driven wheel and the speed of an undriven wheel (or the average speed of the undriven wheels) as a percentage of the undriven wheel speed or average speed.

The degree of wheel spin detected by the wheel spin detector 11 is supplied to the fuel controller 6 in the engine management system. In response to this signal, the fuel controller 6 inhibits the supply of fuel to one or more cylinders of the engine 1 by inhibiting fuel injector signals in accordance with various patterns as will be described hereinafter. The result of this is to reduce the torque of the engine, and hence the driving torque at the driven wheels 7 so as to allow the driven wheels to recover from the wheel spin. For instance, the engine torque may be reduced in accordance with the degree of wheel spin and may be returned to its nominal value when the spinning wheel has recovered as indicated, for instance, by the absence of wheel spin or by the degree of wheel spin falling below an acceptable threshold value.

Figure 2:
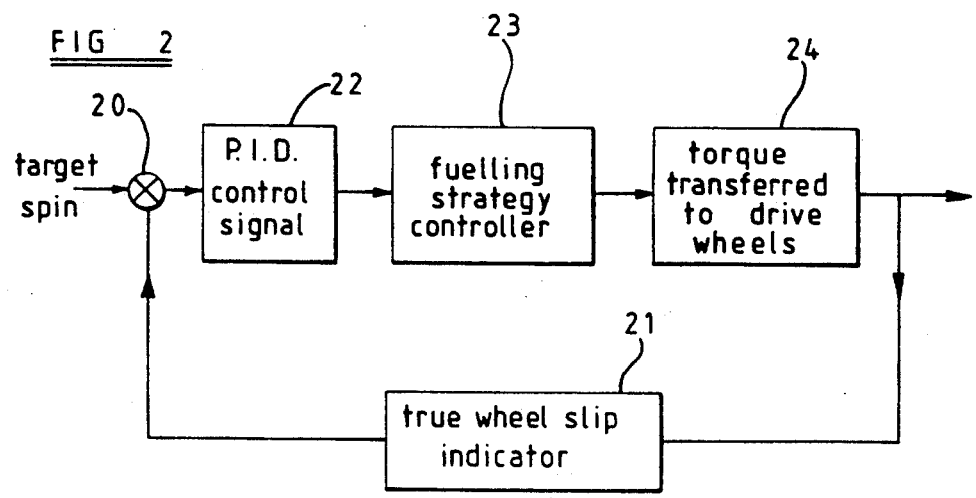
FIG. 2 is a block schematic diagram illustrating operation of part of the controller of FIG. 1.

FIG. 2 illustrates in the form of a block schematic diagram operation of the wheel spin controller, which includes part of the operation of the fuel controller 6 and the wheel spin detector 11 of FIG. 1. A target wheel spin value is supplied to the adding input of a subtracter 20 which receives the current value of the true or actual wheel slip at its subtracting input from a wheel slip indicator 21. The difference signal is supplied by the subtracter 20 to a proportional/integral/differential controller 22 whose output is supplied to a fuelling strategy controller 23. As a result of the action of the controller 23, an appropriate reduced amount of torque is produced by the engine and supplied at 24 to the driven wheels, whose degree of spin or slip is monitored by the indicator 21 so as to provide closed loop control i.e. reduction or elimination, of wheel spin.

Figure 3:
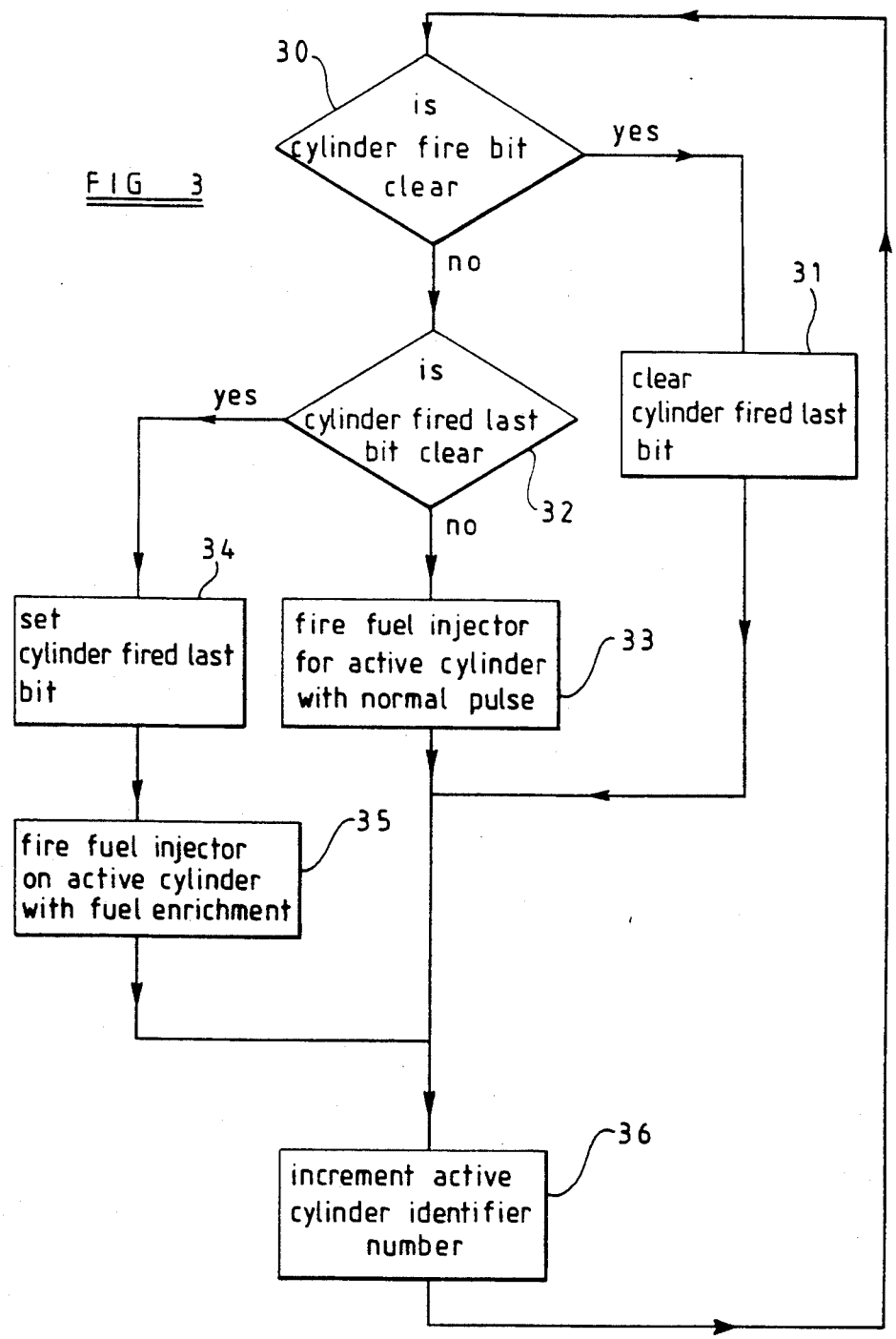
FIG. 3 is a flow diagram illustrating operation of another part of the controller of FIG. 1.

FIG. 3 is a flow diagram illustrating part of the operation of the fuel controller 6 for enriching the combustible mixture supplied to the or each cylinder during its first fuelled cycle following one or more previous unfuelled cycles. A bit indicating whether the next cylinder in the engine firing sequence is to be fuelled is checked at a step 30. If the cylinder is not to be fuelled, then a step 31 clears a bit which indicates during a subsequent cycle that the cylinder has not been fuelled.

If the cylinder is to be fuelled, a step 32 checks whether the cylinder was fuelled during its preceding cycle and, if it was, causes the cylinder to be fuelled in the normal way at step 33. If the cylinder was not fuelled in the preceding cycle, a step 34 sets the bit indicating in the next cycle that the cylinder has been fuelled and, at a step 35, fuels the cylinder with an enriched mixture. An identifier indicating the cylinder being controlled is then incremented in a step 36 and control is returned to the step 30 in synchronism with a fuel impulse for the next cylinder in the firing sequence of the engine.

Figure 4:
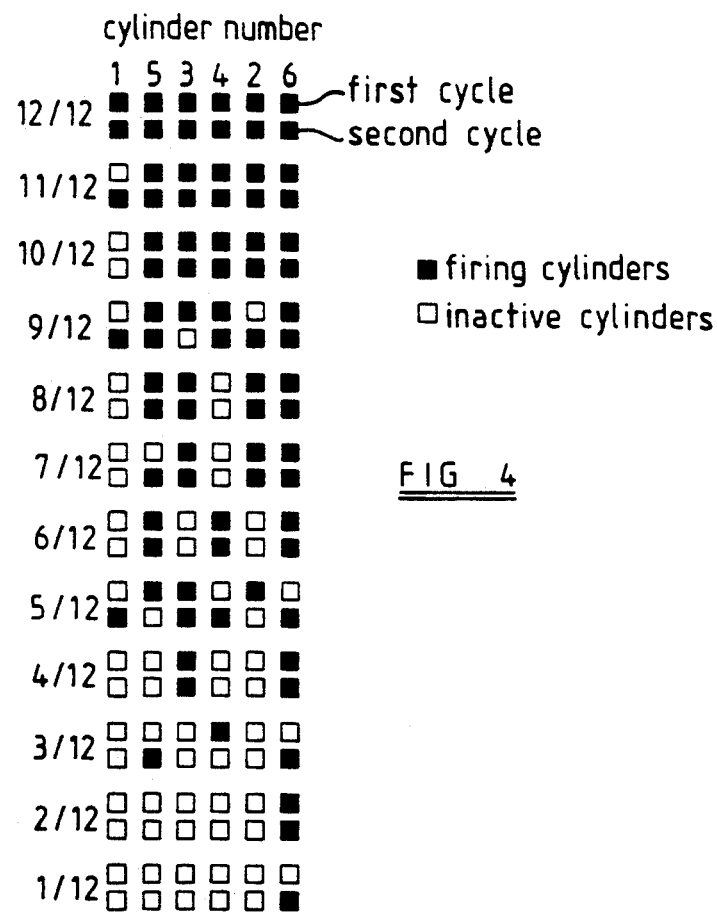
FIG. 4 is diagram illustrating unsatisfactory fuel cutoff patterns for reduced torque operation of the internal combustion engine of FIG. 1.

FIG. 4 illustrates various patterns of firing and inactive cylinders which may be used in order to control the engine torque. Each pattern lasts for two complete engine cycles of the six cylinder engine 1 shown in FIG. 1 and therefore covers a period representing two complete cycles of each of the cylinders of the engine. At the top of the column of patterns, the cylinder number is indicated in the correct order for the firing order of the engine for each of first and second cycles which together make up a single pattern of firing. The quotients to the left of each pattern indicate the number of firing cylinders out of the total of twelve possible firing cylinders for each pattern. Each hatched square represents a firing cylinder whereas each empty square represents an inactive cylinder i.e. one whose fuelling has been inhibited by the fuel controller 6.

The patterns shown in FIG. 4 are unsatisfactory for reasons which will be explained hereinafter. These patterns are derived from an attempt to distribute inactive cylinders as evenly as possible throughout each pattern in order to attempt to maximise the smoothness of running of the engine.

The top pattern 12/12 corresponds to normal full torque operation of the engine such that all of the cylinders are firing throughout both engine cycles of the pattern. The next pattern is for operation with cylinder No. 1 having its fuelling inhibited in the first cycle of the pattern, so that there are 11 firing cylinders in the pattern. The next pattern represents ten firing cylinders out the possible 12 and is derived by inhibiting fuelling of cylinder No. 1 during both the first and second cycles of the pattern.

In the next pattern representing nine firing cylinders out of the possible twelve, cylinders Nos. 1 and 2 are inactive during the first cycle and cylinder 3 is inactive during the second cycle of each pattern. FIG. 4 shows all of the remaining possible patterns.

Figure 5:
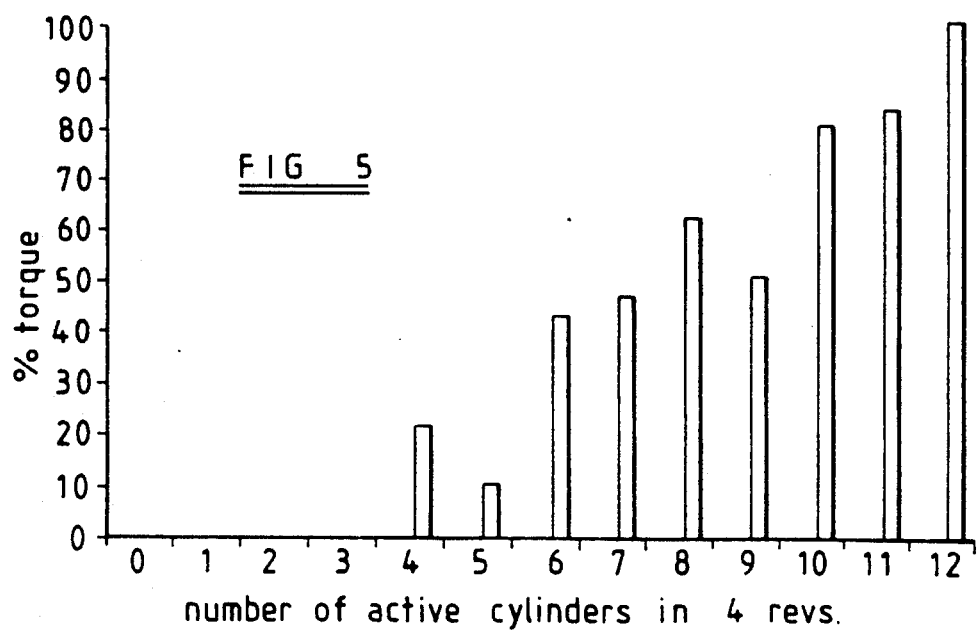
FIG. 5 is a histogram of engine torque for some of the patterns of FIG. 4.

It has previously been assumed that the relationship between engine torque and the number of firing cylinders in each pattern would be monotonic and progressive, following a curve somewhere between linear and exponential. However, as illustrated in FIG. 5, this is not the case. The torque measurements shown in FIG. 5 were taken from a representative six cylinder engine operating at 3,000 revolutions per minute (RPM) with the number of active cylinders in four engine revolutions (two engine firing cycles or one firing pattern) corresponding to those in FIG. 4. Thus, the torque produced by the engine when 4, 6, 8, 10, and 12 cylinder firings take place in each pattern illustrates the expected steady decrease in engine torque. However, the torque outputs for the remaining patterns shown in FIG. 4 display behaviour which is anomalous with this expectation. For instance, the torque for 11 firing cylinders is less than full torque by an amount substantially greater than expected and is greater than the torque for ten firing cylinders by an amount which is substantially less than expected. The torque for seven firing cylinders in accordance with the pattern of FIG. 4 is similarly inconsistent with the torques for 6 and 8 firing cylinders. However, the torques do decrease monotonically for these two triplets of patterns.

The behaviour for 5 and 9 firing cylinders per pattern is substantially more anomalous in that the torque for 9 firing cylinder is less than the torques for both 8 and 10 firing cylinders and the torque for 5 firing cylinders is less than the torque for both 4 and 6 firing cylinders. Thus, these two triplets of patterns display non-monotonic progressions of torque. Thus, controlling engine torque on the assumption that it is monotonically dependent in a progressive way on the number of firing cylinders in the various patterns shown in FIG. 4 leads to inaccurate control of wheel spin which causes somewhat erratic behaviour and tends to prolong recovery from wheel spin by a significant amount.

Figure 6:
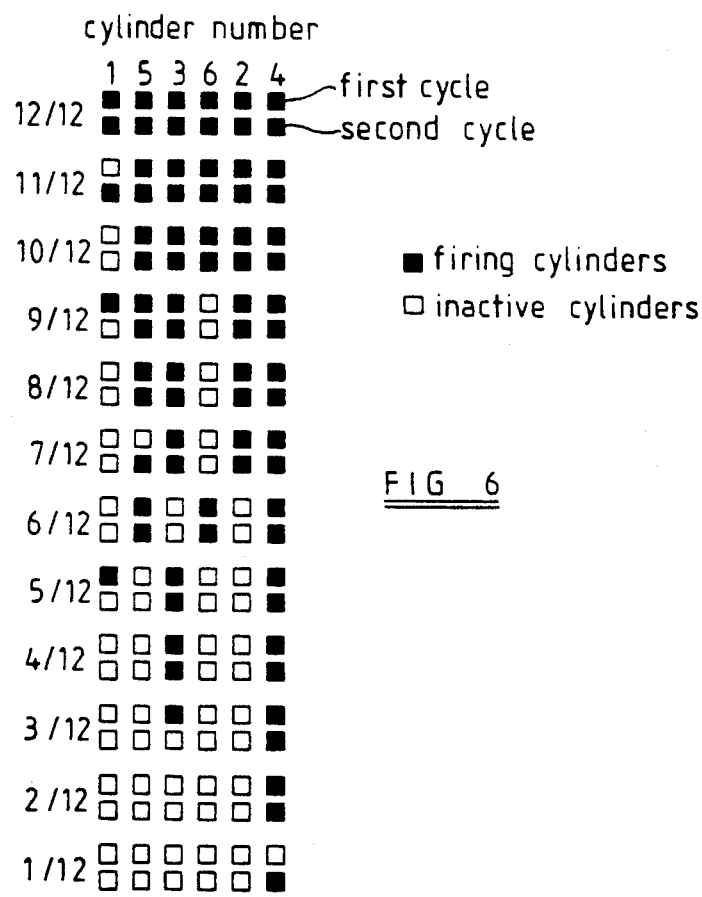
FIG. 6 is a diagram illustrating satisfactory fuel cutoff patterns for reduced torque operation of the internal combustion engine of FIG. 1.

The diagram of FIG. 6 is similar to that of FIG. 4, but illustrates a set of patterns of cylinder firing in accordance with a method constituting an embodiment of the invention. In analysing the inconsistencies in engine torque values produced by the patterns of FIG. 4, it was noted that the non-monotonic behaviour occurred for those patterns where more than one cylinder was being intermittently fuelled. Thus, in the pattern representing nine firing cylinders, cylinders Nos. 1, 3, and 2 are firing only in alternate engine cycles. In the pattern representing five firing cylinders, all of the cylinders except No. 3 are firing only in alternate engine cycles.

In order to eliminate or minimise these effects, the patterns shown in FIG. 6 are adopted whereby the number of intermittently firing cylinders is minimised for each of the patterns. Although the distribution of inactive cylinders in each pattern is no longer even, the effect on torque more closely follows the expected function as illustrated in FIG. 7, for which the engine operating conditions other than the firing pattern are the same as for FIG. 5.

The patterns shown in FIG. 6 may be notionally divided into two sets, the first of which contains patterns having even numbers of firing cylinders and the second of which contains patterns having odd numbers of firing cylinders. In the first set, there are no intermittently firing cylinders. For instance, in the pattern representing 10 firings, cylinder number 1 is inactive for both engine cycles of the pattern and the remaining cylinders are fired for both engine cycles. Similarly, in the pattern for eight firing cylinders, cylinders numbers 1 and 6 are inactive for the first and second engine cycles of the pattern and the remaining cylinders fire for both cycles of the pattern.

In the second set, only one cylinder fires intermittently. For instance, for the pattern with five firing cylinders, cylinder number 1 fires in the first cycle but is inactive in the second cycle, cylinders numbers 3 and 4 are fired in both cycles, and cylinders numbers 5, 6, and 2 are inactive during both cycles of the pattern.

Figure 7:
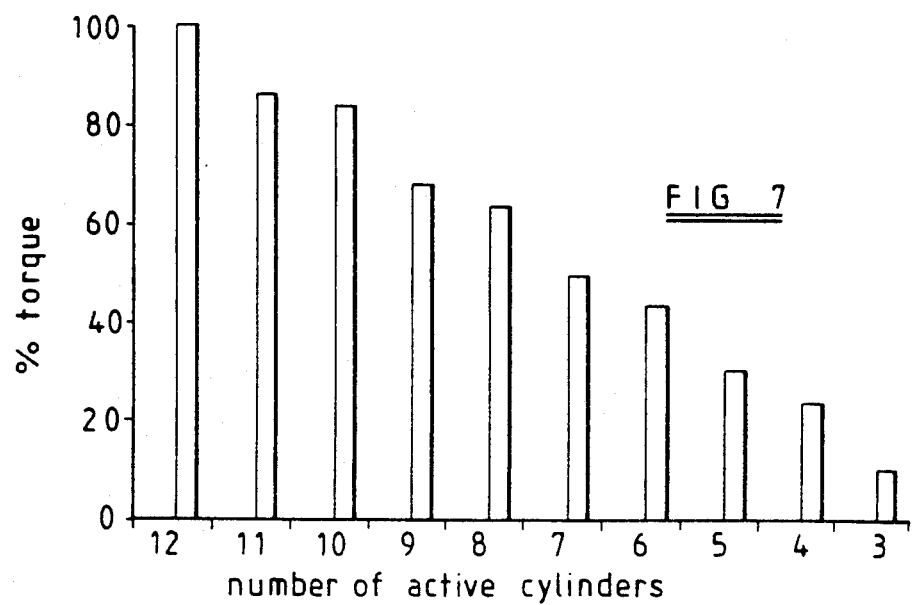
FIG. 7 is a histogram of engine torque for some of the patterns of FIG. 6 without fuel enrichment.

As shown in FIG. 7, torque now decreases monotonically with decreasing numbers of firing cylinders. There remains some anomalous behaviour in that the torque produced by the patterns of odd numbers of firing cylinders is less than expected but, nevertheless, engine torque can be controlled predictably and monotonically so as to provide more efficient control of wheel spin.

Figure 8:
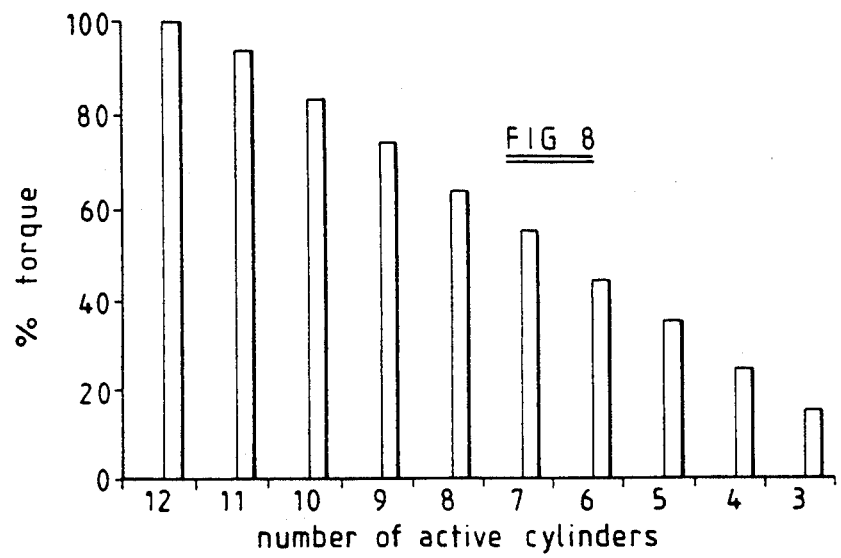
FIG. 8 is a histogram corresponding to FIG. 7 but including fuel enrichment.

In order to correct for the remaining small anomalies in behaviour shown in FIG. 7, the strategy illustrated in FIG. 3 is used whereby the mixture supplied to the intermittently firing cylinder in the patterns containing odd numbers of cylinder firings is enriched so as to restore the relationship between engine torque and number of active cylinders to a substantially linear one as illustrated in FIG. 8. Thus, for the pattern containing eleven firing cylinders shown in FIG. 6 in which cylinder number 1 alternately fires and is inactive, the quantity of fuel supplied to cylinder number 1 in the second cycle of the pattern is increased so as to enrich the mixture compared with the "correct" mixture supplied to the other cylinders and this restores the torque corresponding to eleven active cylinders to a value midway between full torque and the torque for ten active cylinders. The operating conditions of the engine whose performance is shown in FIG. 8 are otherwise identical to those illustrated in FIG. 7.

Figure 9:
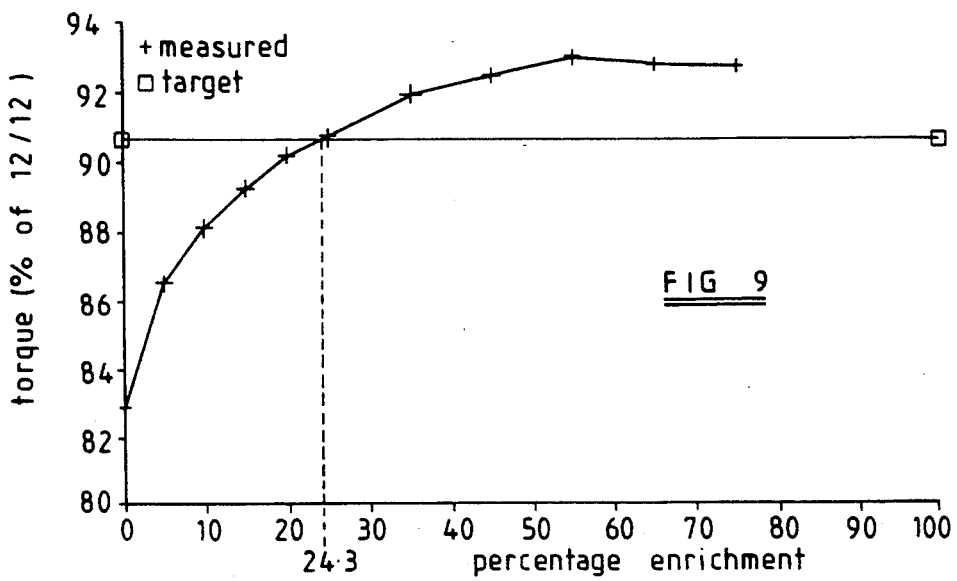

FIG. 9 illustrates the curve of engine torque as a percentage of the full torque for no inactive cylinders against the percentage of enrichment for the intermittently firing cylinder in the case of the pattern in FIG. 6 representing eleven firing cylinders. The target value is indicated by the horizontal line at 91.7% of full torque joining the empty squares whereas actually measured values are plotted by the crosses. As can be seen from this curve, the target torque is achieved for a 24.3% enrichment in the mixture supplied to cylinder number 1 during the second cycle of each pattern. Accordingly, by providing such enrichment, the smooth torque reduction illustrated in FIG. 8 is achieved.

Similar measurements may be made for the other patterns with odd numbers of firing cylinders and may be stored in the fuel controller 6 as a look-up table to permit the correct mixture enrichment for the different patterns. Such values may be stored for different engine speeds and loads and may be addressed by various operating parameters such as the prevailing engine speed, load, temperature, and atmospheric pressure, in order to ensure that the enrichment "correction" is optimised throughout the range of possible engine operating conditions.

Figure 10:
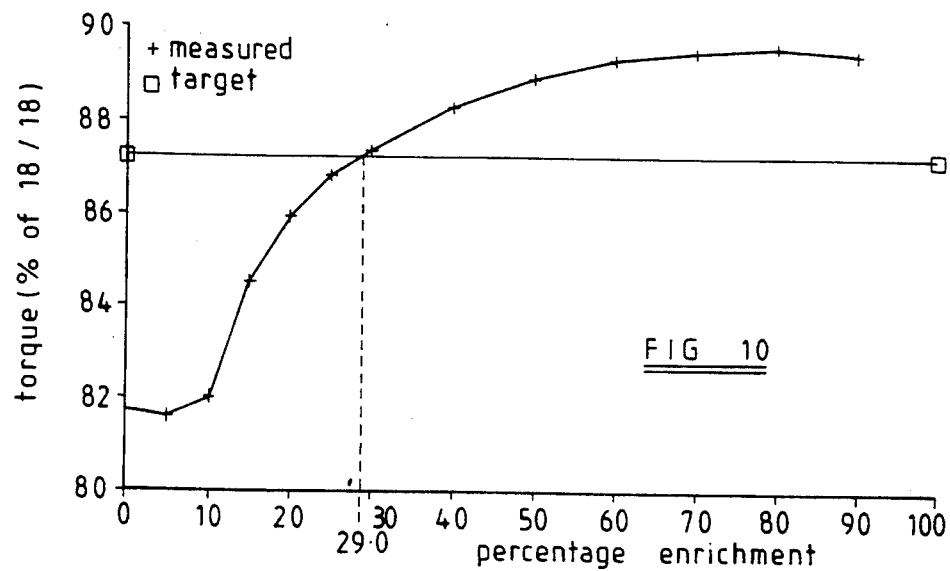
Figure 11:
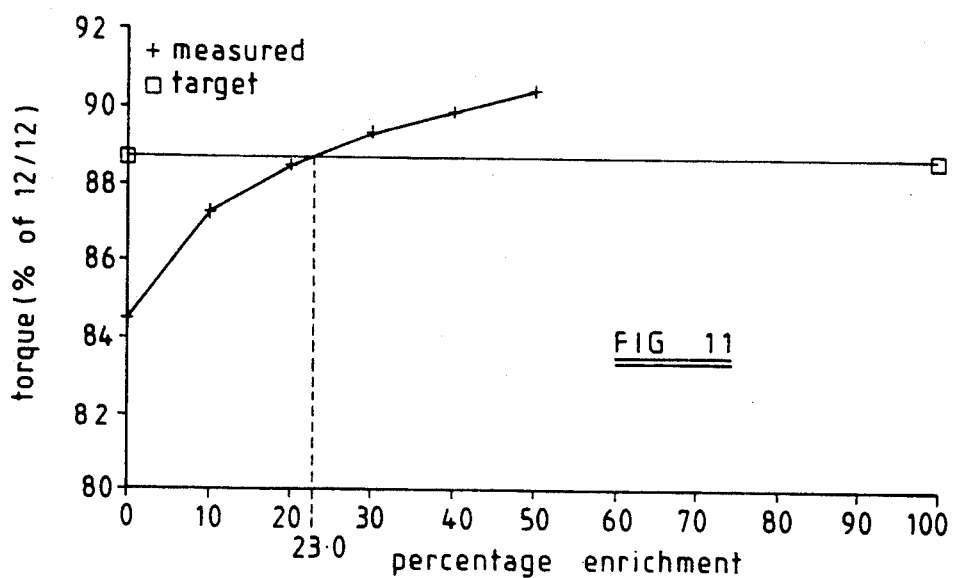

FIGS. 10 to 12 show the same types of curves as FIG. 9 but under different engine operating conditions. Thus, FIG. 10 illustrates the required percentage enrichment for an engine operating on the basis of a pattern equal to three complete engine firing cycles (eighteen cylinder firings) with sixteen cylinder firings during the pattern and cylinder number 1 being inactive for two out of each three cycles of the pattern. The engine is again operating at 3,000 RPM. The percentage enrichment required to restore engine torque to the target value of approximately 87.2% of full torque is approximately 29%.

FIG. 11 represents engine operating conditions which differ from those illustrated in FIG. 9 only in that the engine load (full torque) is reduced to approximately two thirds of that corresponding to FIG. 9. In this case, an enrichment of 23% is required to restore torque to the target value.

Finally, FIG. 12 illustrates a pattern comprising four complete engine cycles (twenty four cylinder firings) with cylinder number 1 being inactive for three of the four engine cycles, corresponding to twenty-one firing cylinders per pattern. Otherwise, the engine operating conditions are the same as in FIG. 9. In this case, an enrichment of 32.4% in the fuelling of cylinder number 1 is required in order to restore the torque to the target value.

It is thus possible to control an internal combustion engine in such a way that predictable values of reduced torque can be obtained, thus allowing efficient and rapid reduction or elimination of wheel spin.

The patterns illustrated in FIG. 6 and the performances illustrated in the subsequent figures were obtained for the patterns with odd numbers of firing cylinders, by intermittently firing the same cylinder in each repetition of the pattern with the engine producing a desired reduced torque. Although it is possible to change the intermittently firing cylinder after each pattern or after each group of patterns for a particular torque, for instance so that all the cylinders of the engine share substantially equally in the inactivity or unfuelled cycles, it was found that such an arrangement resulted in the production of relatively high levels of hydrocarbons in the engine exhaust, and such an arrangement was therefore unacceptable, at least in respect of the engines which have been subjected to testing. With the patterns illustrated in FIG. 6, no problems have been encountered with catalytic converters arranged in the exhaust systems of the engines. In particular, no poisoning or degradation of the catalyst has been observed.

We claim:

1. An apparatus for controlling torque of a multi-cylinder internal combustion engine, said apparatus comprising fuel control means for operating the engine in any one of a plurality of reduced torque modes in each of which the engine produces a reduced torque which is different from that produced by the engine in each other of the plurality of reduced torque modes, said fuel control means including means for inhibiting supply of fuel such that, in each of the plurality of reduced torque modes, at least one of the cylinders is continuously unfuelled and each remaining cylinder is continuously fuelled.

2. An apparatus for controlling torque of a multi-cylinder internal combustion engine, said apparatus comprising fuel control means for operating the engine in any one of a plurality of reduced torque modes, said fuel control means including means for inhibiting supply of fuel such that, in each of the plurality of reduced torque modes, one and only one cylinder is intermittently fuelled.

3. An apparatus as claimed in claim 2, in which said inhibiting means enriches a combustible mixture supplied to the one and only one cylinder when the one and only one cylinder is fuelled.

4. An apparatus for controlling torque of a multi-cylinder internal combustion engine, said apparatus comprising fuel control means for operating the engine in any one of a plurality of reduced torque modes comprising first and second sets of modes, the first set comprising at least one mode and the second set comprising at least one mode, said fuel control means including means for inhibiting supply of fuel such that, in each mode of the first set, at least one cylinder is continuously unfuelled and each remaining cylinder is continuously fuelled and, in each mode of the second set, one and only one cylinder is intermittently fuelled.

5. An apparatus as claimed in claim 4, in which said inhibiting means enriches a combustible mixture supplied to the one and only one cylinder when the one and only one cylinder is fuelled.

6. An apparatus as claimed in claim 4, in which said inhibiting means enriches a combustible mixture supplied to at least one cylinder when the at least one cylinder changes from being an unfuelled cylinder to being a fuelled cylinder.

7. An apparatus for controlling torque of a multi-cylinder internal combustion engine, said apparatus comprising fuel control means for controlling supply of a combustible mixture including fuel to the engine, means for intermittently supplying the combustible mixture to at least one of the cylinders, and means for temporarily enriching the combustible mixture when said supplying means resupplies the combustible mixture to the at least one of the cylinders.

8. A method of controlling torque of a multi-cylinder internal combustion engine, said method comprising selectively operating the engine in any one of a plurality of reduced torque modes, in each of which the engine produces a reduced torque which is different from that produced by the engine in each other of the plurality of reduced torque modes, by continuously unfuelling at least one of the cylinders and continuously fuelling each remaining cylinder.

9. A method of controlling torque of a multi-cylinder internal combustion engine, said method comprising selectively operating the engine in any one of a plurality of reduced torque modes by intermittently fuelling one and only one of the cylinders.

10. A method as claimed in claim 9, in which the one and only one of the cylinders, when fuelled, is supplied with an enriched combustible mixture.

11. A method of controlling torque of a multi-cylinder internal combustion engine, said method comprising selectively operating the engine in any one of a plurality of reduced torque modes exclusively comprising a first set of modes and a second set of modes, the first set comprising at least one mode and the second set comprising at least one mode, wherein in each mode of the first set, at least one cylinder is continuously unfuelled and each remaining cylinder is continuously fuelled and, in each mode of the second set, one and only one cylinder is intermittently fuelled.

12. A method of controlling torque of a multi-cylinder internal combustion engine, said method comprising selectively operating the engine in any one of a plurality of reduced torque modes comprising first and second sets of modes, wherein, in an at least one of the first set of modes, at least one cylinder is continuously unfuelled and each remaining cylinder is continuously fuelled and, in an at least one of the second set of modes, one and only one cylinder is intermittently fuelled, and in which the one and only one of the cylinders, when fuelled, is supplied with an enriched combustible mixture.

13. A method of controlling torque of a multi-cylinder internal combustion engine, said method comprising selectively operating the engine in any one of a plurality of reduced torque modes comprising first and second sets of modes, wherein, in an at least one of the first set of modes, at least one cylinder is continuously unfuelled and each remaining cylinder is continuously fuelled and, in an at least one of the second set of modes, one and only one cylinder is intermittently fuelled, and in which a combustible mixture supplied to at least one cylinder is enriched when the at least one cylinder changes from being an unfuelled cylinder to being a fuelled cylinder.

14. A method for controlling torque of a multi-cylinder internal combustion engine, said method comprising reducing the torque by intermittently fuelling at least one cylinder and temporarily enriching a combustible mixture supplied to the at least one cylinder in a fuelled cycle thereof following an unfuelled cycle thereof.

* * * * *